US011941984B1

(12) United States Patent
Lamprecht

(10) Patent No.: US 11,941,984 B1
(45) Date of Patent: Mar. 26, 2024

(54) METHOD FOR DETERMINING THE PROBABILITY OF A COLLISION BETWEEN ROAD USERS

(71) Applicant: Gerhard Lamprecht, McHenry, IL (US)

(72) Inventor: Gerhard Lamprecht, McHenry, IL (US)

(73) Assignee: Gerhard Lamprecht

(*) Notice: Subject to any disclaimer, the term of this patent is extended or adjusted under 35 U.S.C. 154(b) by 48 days.

(21) Appl. No.: 17/964,904

(22) Filed: Oct. 12, 2022

Related U.S. Application Data

(60) Provisional application No. 63/255,501, filed on Oct. 14, 2021.

(51) Int. Cl.
*B60Q 1/00* (2006.01)
*G08G 1/16* (2006.01)

(52) U.S. Cl.
CPC .................................... *G08G 1/16* (2013.01)

(58) Field of Classification Search
CPC ...................................................... G08G 1/16
USPC ........................................................ 340/436
See application file for complete search history.

(56) References Cited

U.S. PATENT DOCUMENTS

| | | | | |
|---|---|---|---|---|
| 9,701,307 | B1 * | 7/2017 | Newman | B60W 30/09 |
| 11,320,518 | B2 * | 5/2022 | Mende | G01S 7/021 |
| 2022/0246036 | A1 * | 8/2022 | Petersen | G06Q 40/08 |

* cited by examiner

*Primary Examiner* — Tai T Nguyen

(57) ABSTRACT

A traffic safety system is provided at intersections that store road user trajectories in relation to external influences and road user classes so that it can establish a baseline with which future trajectories can be compared in order to predict a deviation from the baseline which is used to calculate probable and possible collision severity in order to provide a means by which a range of mitigating responses can be activated.

7 Claims, 3 Drawing Sheets

METHOD FOR DETERMINING THE PROBABILITY OF A COLLISION BETWEEN ROAD USERS

CROSS-REFERENCE TO RELATED APPLICATIONS

This patent specification claims the benefits of provisional patent No. 63/255,501 dated 2021 Oct. 14

References Cited: U.S. Pat. No. 11,320,518 B2

FIELD OF THE INVENTION

This invention relates to a method for determining the probability of a collision between road users at road intersections for the purpose of mitigating possible collisions in a way that minimize false or dangerous mitigation. The term “road user” refers to vehicular traffic, pedestrian traffic, bicycles and where appropriate, could be more widely construed to include robotic moving objects and stationary objects as well.

BACKGROUND OF THE INVENTION

Many conventional active safety systems at traffic intersections measure the location and speed of vehicles and then calculate if a collision is imminent based on predetermined formulae or values. The three significant limitations to this method are that its performance is based on the assumption that different vehicles and road users will behave the same beyond the time of measurement, its performance is based on the assumption that the predetermined formulae is correct in real world scenarios and its performance is based on the assumption that the risk at different locations are similar. Related to traffic collisions, proportional to the speed differential between possible colliding objects, the detection performance is proportional to how long before the collision the system can predict a collision to allow enough time for human response and mitigation to be effective. The detection performance is further determined to which extent it can minimize detection of false hazards as well as to which extent it does not miss hazards. These three limitations decrease conventional systems overall detection performance.

Added to the detection limitations of conventional safety systems, the activation of mitigating mechanisms could present a higher risk or cause a worse outcome than the collision it is attempting to mitigate and therefore a detection system that provide a binary output are statistically more likely to over-react to false hazards and to under-react to true hazards. Mitigation for higher degrees of risk require more substantial mitigation warnings and responses whereas mitigation for lower degrees of risk would require more suggestive warnings. In systems with a binary output, a significant number of mitigating responses will be will be over-reacting or under-reacting.

Conventional traffic collision avoidance systems are further designed to repeat past behavior which include false mitigation as well as missed mitigation together with the correct behavior. These systems do not employ the ability to measure the performance of the system, in order to improve the performance.

BRIEF SUMMARY OF THE INVENTION

It is an object of this invention to provide a method to calculate the probability of a possible collision that overcomes, at least to some extent, the disadvantages of conventional systems and methods described above. The invention will reduce the number of serious and fatal accidents at intersections by predicting the hazardous behavior and changing road user behavior to prevent probable consequences.

The system and method of the invention record and store approach trajectories per class of road user such as pedestrian, bicycle, motorcycle, sedan, delivery van, small truck, bus and large truck together with signal information.

In accordance with the first aspect, after a baseline of approach trajectory behavior is recorded, all subsequent approaching road users of that class is statistically compared to the baseline. The statistical deviation as well as the projected time and velocity of impact for predicted trajectories that has intersect is reported.

In accordance with the previous aspect of the invention there is provided a method for using the baseline as a possible result and using the most recent two seconds of behavior as a probable result. These results are reported to a plural of mitigation mechanisms.

Still further features of the invention provide for the system to store responses to mitigation as another category of baseline, to be used to refine the probable result calculation.

The invention may make use of unsupervised computer learning algorithms to optimize the acceptance or reaction of new samples to be added to the pool of current behavior.

DETAILED DESCRIPTION OF THE INVENTION

Figure 1:
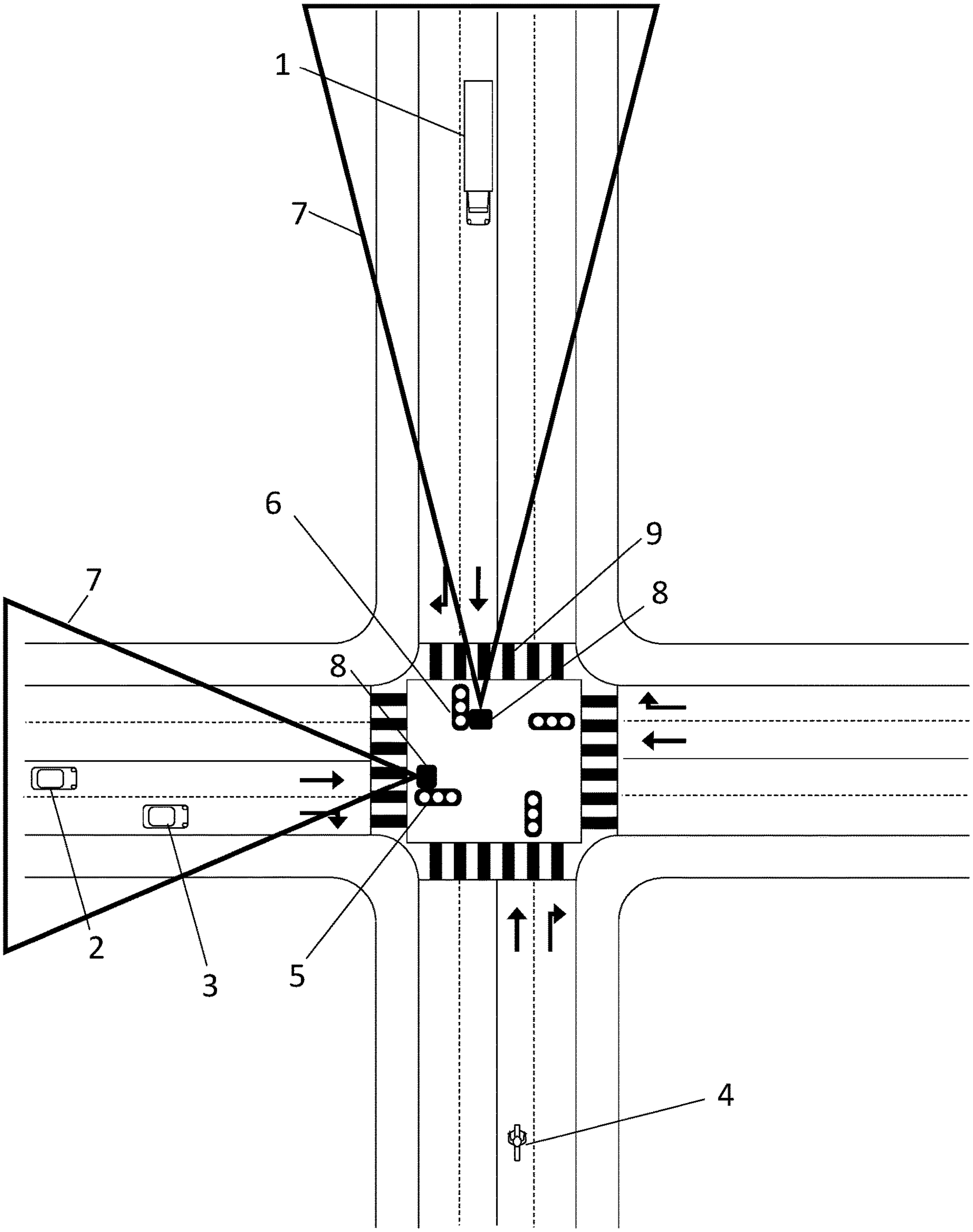
FIG. 1: is a schematic plan view of an intersection that forms part of one form of the system according to the invention.

As provided by this invention, in reference to FIG. 1, a trajectory data source (8), which for instance is a multi-target tracking radar with coverage beam (7) is mounted at an intersection, which for instance is signalized with traffic signals (5) and (6). In another embodiment this arrangement may include any combination of signals and data sources.

In another embodiment of this invention also pedestrian crossings (9) can produce trajectory data of pedestrians and bicycles.

A feature of this invention is that it records trajectories of individual cars (2) and (3) as well as different classes of vehicles such as trucks (1) and motorcycles (4) in order to classify the different behavior of each specific vehicle class in each specific lane in each specific approach under each specific signal (5) condition.

Figure 2:
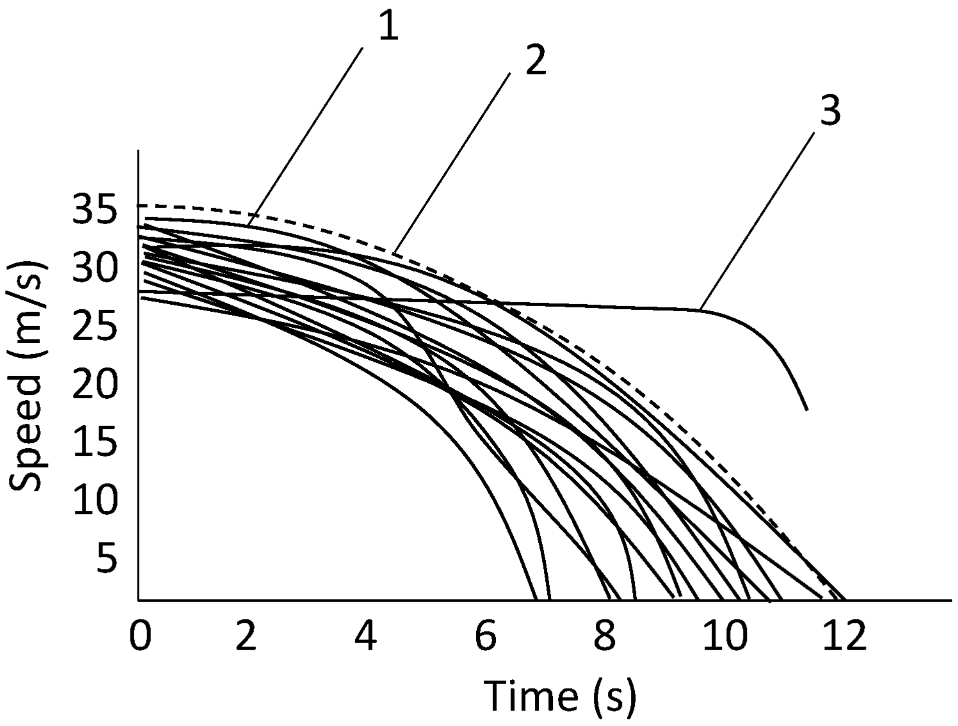
FIG. 2: is a graph that represent normal traffic data stored in the system as well as one exception.

One illustration of such a recording is where a signal (5) is yellow and signal (6) is red, and for vehicle class sedan and straight lane 2, graphed as FIG. 2. In FIG. 2 (1) illustrate one of a plural of previous recordings in the class described above where a baseline deceleration (2) has been established illustrating expected behavior for a sedan under these circumstances, that include class, timing, lane, approach. For this illustration a vehicle (3) exhibiting abnormal behavior can be more effectively identified than conventional systems that are generalized and rigid according to the background.

A further extension of the invention may include further classification of normal behavior based on weather conditions, time of day, day of week and month of year.

Figure 3:
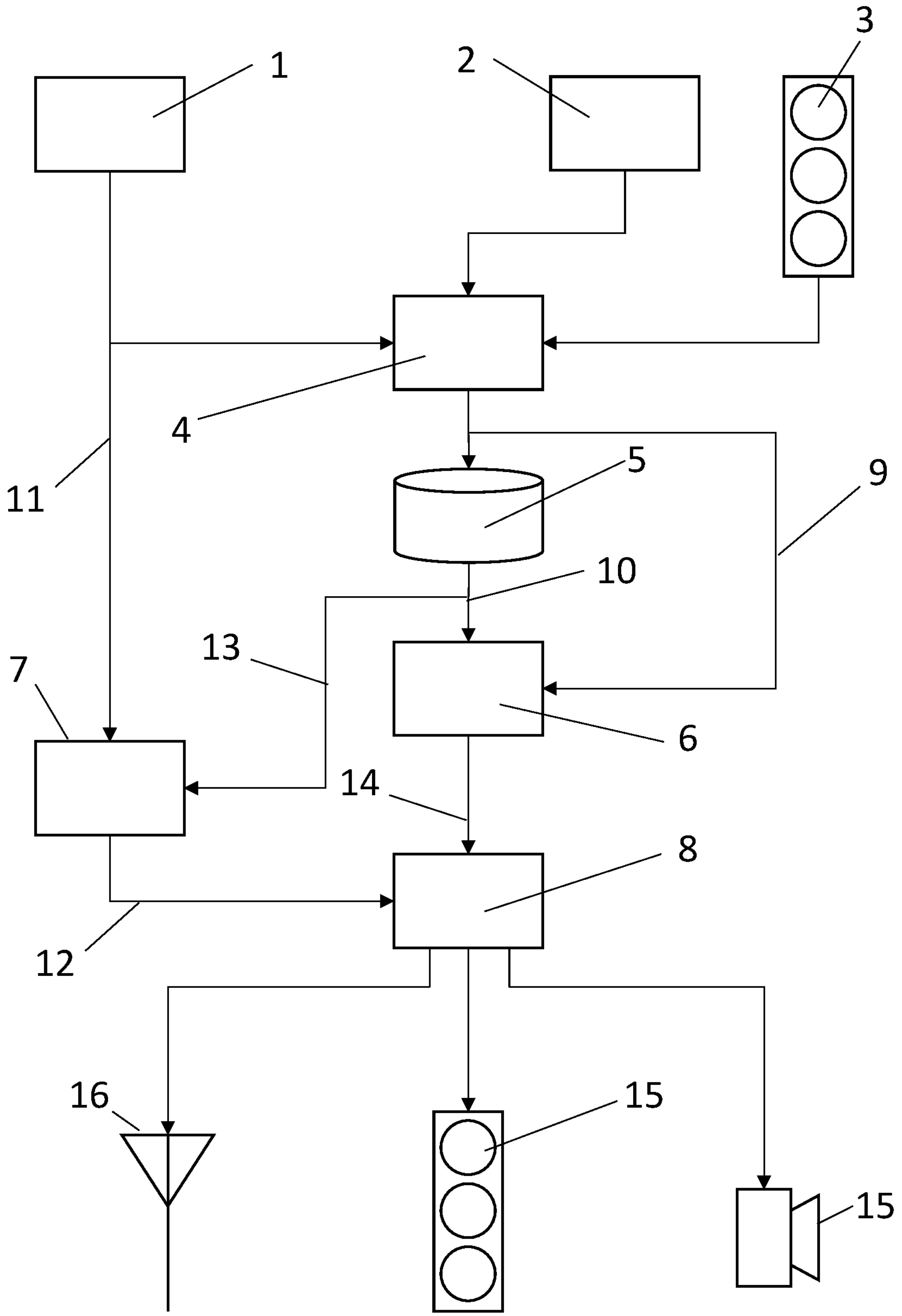
FIG. 3: is a block diagram illustrating a simple form of the system according to the invention for recording traffic trajectories, calculating probabilities and communicating.

FIG. 3. illustrate one embodiment of the invention method where trajectory data produced by sensors or communications (1) are classified according to the classification data (2) that include approach number, lane number, vehicle length, visibility and surface conditions and combined with signal (3) data by a mapping table (4) and recorded on storage (5)

Simultaneously as further shown in FIG. 3, the method of the invention includes reading prior trajectory data (10) for a particular class of storage and continuously comparing it with real-time trajectory data (9) through a statistical processing algorithm (6) in order to calculate the extent of deviation and report the statistical probability to algorithm (8). The algorithm (7) continuously calculates the time to impact and the speed of impact for all current objects (11) considering typical historic trajectories from that point onwards (13) and also assuming current velocity. Both the range of severity of the collision (12) as well as the probability of the road user changing his behavior (14) is communicated to a safety response system (8) that will determine which response is most appropriate for the scenario being for example turning all signals (15) red or providing a increased brightness rapid warning red (15) flash to alert the possible inattentive driver or to provide audible (15) warning or provide connected vehicle alerts of varying degree (16) inside one or both vehicles.

The system and method of the invention may also be used in combination with roadway surface sensors to account for snow and ice responses of vehicles as well as behavioral change from road users.

The invention require data that represent continuous trajectory of each approaching road user for a sufficiently long distance in time in order to determine the behavior of the road user. At typical approach velocities to intersections vehicle tracking of 6-8 seconds must be achieved, typically provided by multi target tracking radar sensors.

The system and method of the invention may also be used in combination with personal or vehicle communications that provide tracking information with an update rate of at least one report per 2 meters.

The method of the invention determines a probability as a continuous range of probabilities in order to allow activation of a range of mitigations that include changing the signal for one or more road user, providing audible warning, providing mobile or in-vehicle warning, vibration or increasing mechanical readiness for possible response. In addition, responses can include actual responses such as decelerating vehicles, activating barriers. The invention therefore provides a method for a range of mitigations to be activated most appropriately for each kind or type of road user.

The system and method may also be used with connected vehicles where the vehicle location, speed and identification are continuously transmitted in real time.

The system and method of the invention may also be used in combination with visibility sensors to account for behavioral differences during low visibility and night time.

For the purpose of this invention, road users such as pedestrians would not be required to be tracked is individuals because their behavior at crossings are not individualistic.

The invention claimed is:

1. A method for calculating a probability of a collision between vehicle to reduce a number of serious and fatal accidents at intersections by predicting a hazardous behavior and changing road user behavior to prevent probable consequences, comprising:

- receiving a real-time trajectory data of current objects produced by multi target tracking radar sensors, wherein the trajectory data includes vehicle location and vehicle speed;
- reading prior trajectory data for a particular class of vehicle and continuously comparing it with said received real-time trajectory data of the same class in order to calculate an extent of deviation and a statistical probability;
- calculating a time to impact and a speed of impact for all current vehicles considering typical historic trajectories from that point onwards;
- tracking of velocity and location trajectory over time for more than one intersecting path of a vehicle and relating said velocity and location trajectory to a set of prior velocity and location trajectories for a similar vehicle class of behavior in order to determine behavior of road users;
- determining which response to mitigate a collision will be most appropriate for each scenario to alert a possible inattentive driver; and
- actuating possible appropriate action to each scenario.

2. The method of claim 1, wherein the class of behavior can be construed as other measurable factors that characterize lateral and expected deceleration behavior including a physical length of a vehicle, a weight of the vehicle, a time of day, a day of week, a season, road conditions, precipitation, and visibility.

3. The method of claim 1, wherein the vehicle can be construed as pedestrians, bicycles, motorcycles, vans, buses, trucks, trams or rail.

4. The method of claim 1, wherein an impact energy is also calculated assuming one or more vehicles do not respond to mitigation attempts.

5. The method of claim 1, wherein one or more mitigation systems are triggered through a decision matrix based on calculated outputs of claim 1.

6. The method of claim 1, wherein the statistical calculations and responses to mitigations are recorded in order to improve the mitigation response matrix.

7. The method of claim 1, wherein in addition road construction parameters including road geometry, lines, lane widths warning signs, sight distance, skid resistance are considered as it relates to the probability of a collision or the severity of a collision.

* * * * *